Patented Dec. 23, 1924.

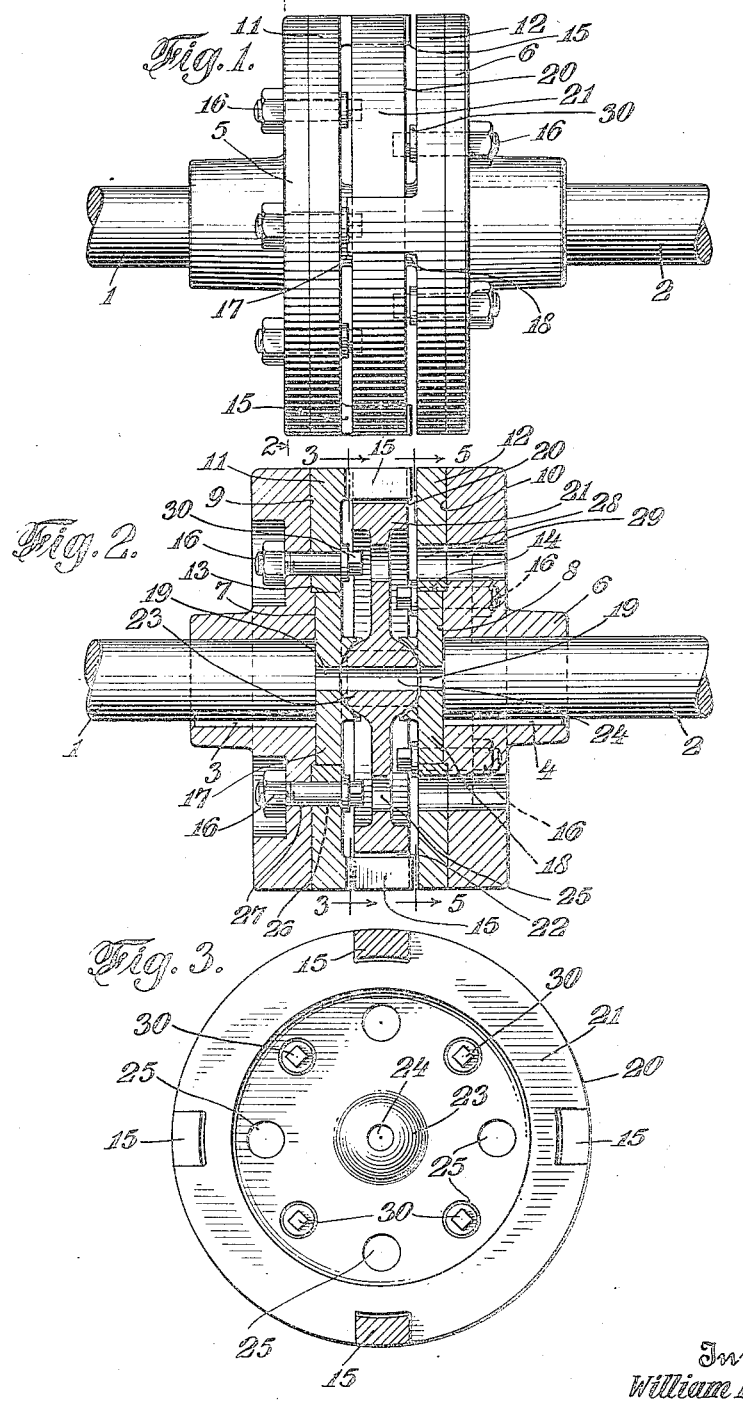

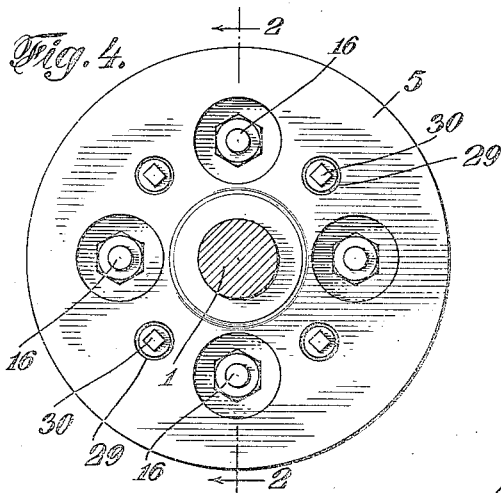
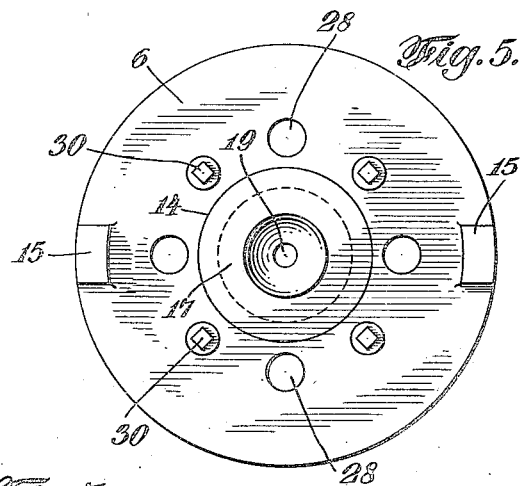
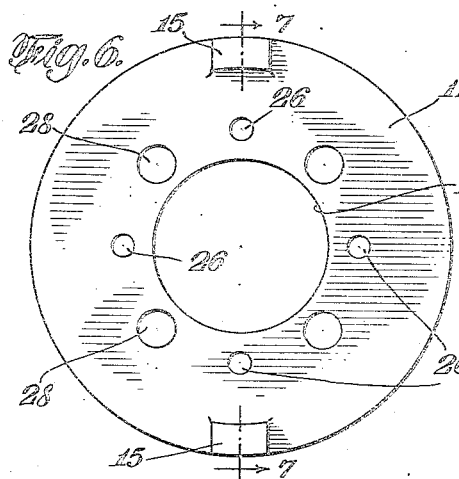
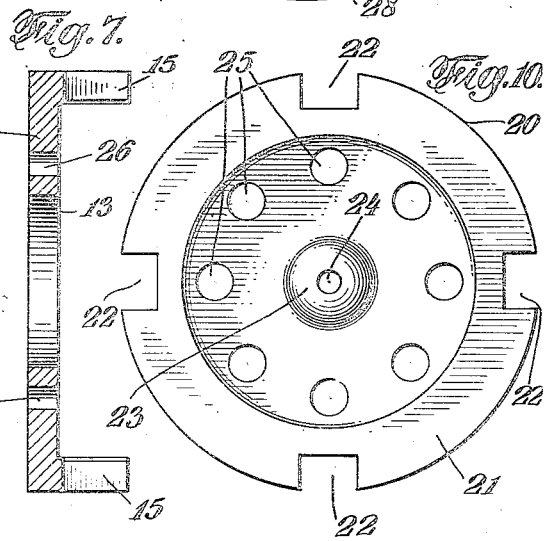
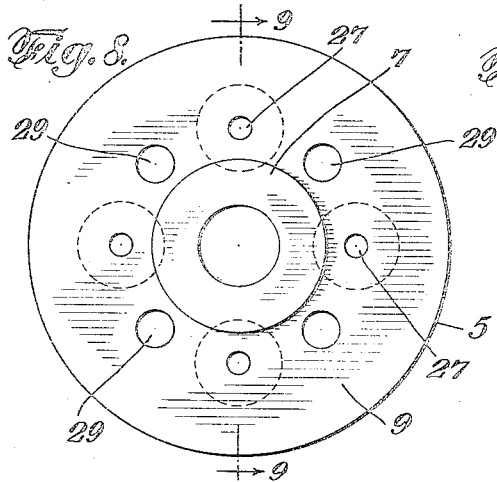
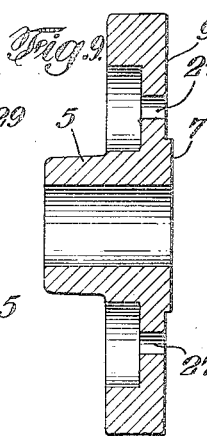
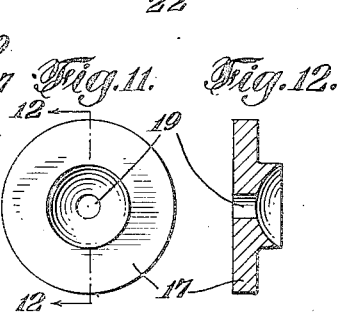

1,520,336

UNITED STATES PATENT OFFICE.

WILLIAM DENZER, OF NEW YORK, N. Y.

COUPLING.

Application filed July 12, 1921. Serial No. 484,074.

*To all whom it may concern:*

Be it known that I, WILLIAM DENZER, a citizen of the United States, and resident of 191 West End Ave., New York city, in the county of New York and State of New York, have invented certain new and useful Improvements in Couplings, of which the following is a specification.

This invention relates to transmission couplings in general, and particularly to the kind known as link or flexible couplings.

The objects of my invention are to provide a solid shaft coupling adapted for units of high speed and great power, and it is particularly designed for connecting electric motors, turbines, dynamos, pumps, and like machinery.

A further object of my invention is to provide such device, consuming as little space as possible between two shafts to be jointed, having a neat appearance, being safe in operation, and adapted to be either joined or demounted without necessitating displacing of the shafts to be joined.

Further objects of my invention are to provide a coupling adapted to join shafts which are out of alinement, that is when their center axes are displaced either at an angle to each other, or offset either sidewise or in substantially vertical direction.

A further object of my invention is to provide a coupling which will space and take up the thrust between the two shafts joined by said coupling, no matter at what angular displacement, or how badly out of alinement the shafts may be.

The above advantages become particularly important, when my device is applied to shafts subjected to various vibrations, or where the shaft units became out of alinement by settling of bearings, or through other causes.

The foregoing and further objects will be more fully apparent from the following description and the accompanying drawing, forming a part of this specification, and in which:—

Fig. 1 represents a front elevation of a preferred form of my device.

Fig. 2 is a cross sectional view taken on line 2—2 of Fig. 1, and represents another preferred form of my device.

Fig. 3 is a sectional view taken on line 3—3 of Fig. 2, showing the inner coupling member.

Fig. 4 is an end view of one preferred form of my device.

Fig. 5 is a sectional view taken on line 5—5 of Fig. 2.

Fig. 6 is a detail view showing a preferred form of a claw member.

Fig. 7 is a sectional view therethrough, taken on line 7—7 of Fig. 6.

Fig. 8 is an inner view of the outer flange member.

Fig. 9 is a sectional view taken on line 9—9 of Fig. 8.

Fig. 10 is a detail view of a preferred form of the inner or central member.

Fig. 11 is an inner view of a cup-shaped element for receiving the spherical center portion of the inner member.

Fig. 12 is a cross sectional view taken on line 12—12 of Fig. 11.

Referring to the drawings, numerals 1 and 2 indicate the shaft ends of a driving and driven or following unit, respectively.

Keyed at 3 and 4 to the shaft ends or otherwise associated therewith are flanged end or outer members 5 and 6, shown in detail in Figs. 8 and 9. The inner face of each of the flange members is preferably equipped with bosses 7 and 8, extending beyond angular recessed portions 9 and 10, adapted to receive ring-shaped claw members 11 and 12 respectively, as shown in detail in Figs. 6 and 7.

The bosses 7 and 8 register with the circular openings 13 and 14 of the claw members, which are equipped at their periphery with a plurality of claws or lugs 15. These claw members are permanently associated with the flange members by means of bolts 16, and are so arranged that the claws of one claw member is set at substantially half the distance between the claws of the other claw member.

Also registering with the circular cut-out portions 13 and 14 of the claw members, are cup-shaped thrust elements 17 and 18, as shown in detail in Figs. 11 and 12.

These claw members are provided with a central bore 19 for receiving a lubricant therein. The thrust members abut with the bosses 7 and 8 respectively, when the device is in operation.

Disposed between the end members is an inner or central disk lick member 20, shown in detail in Fig. 10, provided with an annular enlargement 21, having a plurality of notches 22, adapted to receive the lugs or claws 15 of claw members 11 and 12. The central portion 23 of the inner member is spherically shaped and also provided with a central bore 24, adapted to receive a lubricant.

It will be noted, that the radius of the curvature of the cup of the thrust members is somewhat larger than that of the curvature of the spherical part 23 of the inner member, in order to provide a swivel motion of the inner member between the outer flange members in the event that the shaft ends 1 and 2 are not in perfect alinement.

In assembling my device, the claws of claw member 11 engage two opposite notches provided in the inner member 20, while the claws of claw member 12 engage the other pair of oppositely disposed notches of the inner member.

In order to facilitate assembling, the inner member is provided with a plurality of apertures 25, registering with the bolt holes 26 of the claw members, which again register with the bolt holes 27 provided in the outer or flange members 5 and 6.

Similar to openings 25, there are provided between each two bolt apertures 26 and 27 of the claw members and claw flange members, respectively, operating holes 28 and 29, in both the claw and flange members, respectively. These apertures 29 register with the apertures 25 of the inner member.

The bolts 16 are preferably equipped with a head 30, (Fig. 2). The bolt is inserted successively through apertures 29, 28 and 25, until the threaded portion has passed through bolt holes 26 and 27. Apertures 29, 28 and 25 are sufficiently large to permit bolt head 30 to pass therethrough.

It is obvious, however, that the arrangement of the bolts may be readily changed, as the bolts may be placed at the periphery of the flange and claw members (not shown in the drawings), in which case, however, the diameter of my device would be increased.

It will be noted (Figs. 1 and 2) that there is a sufficient space provided between the claw members and the inner members 15 to permit the latter to swivel in the sockets of the cup-shaped members toward and from the faces of the claw members, when the shafts are not in alinement.

The spherical center enlargement 23 of the inner member together with the cup-shape thrust members 17 and 18 take up the axial thrust of the shafts 1 and 2, while in no way impairing the swiveling movement of the inner member.

From the foregoing, it will be evident that my device is capable of fulfilling the requirements of a flexible transmission coupling, adapted to make connections between two shafts, whether perfectly alined, out of alinement, or at angular relation to each other, and has the advantage of being a compact, and absolutely positively interlocking device.

It is obvious that the specific design shown in my drawings, may be changed in construction while the principle of positive and flexible inter-engagement of parts is adhered to, and it is also obvious that various materials may be employed in the manufacture of my device, which will be most suitable for the different strains to which the parts are subjected.

Thus, the inner member may be made of either metal or fiber, or it may be so constructed that the peripherally inter-engaging parts may be of different material than the center portions adapted to facilitate swiveling of the inner member.

In designing my device for manufacturing purposes, the shapes, connections, and the material employed may be improved by man skilled in the art, but the basic principle of peripherally inter-engaging elements with an inner element facilitating a flexible joint between the rigidly attached members must be adhered to.

When it is desired to disconnect the driving and driven units without altering their relative positions, it is only necessary to remove the bolts at one half of my device, whereby the latter becomes inoperative.

Having thus described my invention, I reserve for myself the right to make such changes and improvements derived at during the process of manufacture, and what I claim is:—

1. A transmission coupling comprising a pair of rotatable outer members adapted to be rigidly associated with the ends of two shafts, a plurality of individual members disposed between said outer members and forming a unit independent from said outer members when not connected with the latter, said individual members comprising claw elements, adapted to be rigidly but removably associated with said outer members, an inner thrust element, adapted to interengage with said claw elements, and outer thrust elements, adapted to engage said inner thrust element and capable of independent movement relative to said outer members, said claw element and said inner thrust element.

2. In a coupling, a pair of rotatable flanged members, substantially ring-shaped claw elements adapted to be rigidly but removably associated with each of said flanged members and having peripheral claws, said claw elements being so disposed, that the claws of one element are at substantially the center of the space between the claws of the other element, cup-shaped centering elements capable of moving independently relative to their respective claw elements and flanged members, said centering elements set within each of said claw elements, a disc-like inner member having a spherical central enlargement adapted to be engaged by the cup-shaped elements and provided with peripheral notches for receiving the claws of both claw elements, thus providing a flexible connection between said flanged members, and independent and removable means for connecting said claw elements with said outer members.

Signed at New York in the county of New York and State of New York, this 9th day of July, A. D. 1921.

WILLIAM DENZER.